(12) United States Patent
Toda

(10) Patent No.: US 6,549,247 B2
(45) Date of Patent: Apr. 15, 2003

(54) ULTRASONIC LIQUID-CRYSTAL DISPLAY

(76) Inventor: Kohji Toda, 1-49-18 Futaba, Yokosuka 239-0814 (JP)

(*) Notice: Subject to any disclaimer, the term of this patent is extended or adjusted under 35 U.S.C. 154(b) by 184 days.

(21) Appl. No.: 09/801,133

(22) Filed: Mar. 6, 2001

(65) Prior Publication Data
US 2002/0126227 A1 Sep. 12, 2002

(51) Int. Cl.[7] .................................................. G02F 1/13
(52) U.S. Cl. ........................... 349/2; 359/285; 359/311; 359/312
(58) Field of Search ................................. 359/285, 311, 359/312; 349/2

(56) References Cited

U.S. PATENT DOCUMENTS

| | | | | |
|---|---|---|---|---|
| 5,172,251 A | * | 12/1992 | Benton et al. ................... 359/9 |
| 5,900,966 A | * | 5/1999 | Kim et al. ..................... 359/311 |
| 6,081,365 A | * | 6/2000 | Kim ............................... 359/312 |
| 6,307,665 B1 | * | 10/2001 | Kim et al. ..................... 359/311 |
| 6,433,916 B1 | * | 8/2002 | Bademian et al. ........... 359/285 |
| 6,449,083 B1 | * | 9/2002 | Nishiyama ................... 359/285 |

* cited by examiner

Primary Examiner—Kenneth Parker
Assistant Examiner—David Chung

(57) ABSTRACT

An ultrasonic liquid-crystal display comprises a nonpiezoelectric bottom-plate, a piezoelectric substrate on a first surface-part of an upper end-surface of the nonpiezoelectric bottom-plate, at least one dispersive interdigital transducer on the piezoelectric substrate, a nonpiezoelectric upper-plate, a first conducting electrode, with which a second surface-part of the upper end-surface of the nonpiezoelectric bottom-plate is covered, a second conducting electrode, with which a lower end-surface of the nonpiezoelectric upper-plate is covered, and a liquid crystal between the first- and second conducting electrodes. The nonpiezoelectric bottom-plate and the nonpiezoelectric upper-plate have a transparency, respectively. When a first electric signal is applied to the dispersive interdigital transducer, an FM chirp-SAW is excited in the piezoelectric substrate. The FM chirp-SAW transmitted to the liquid crystal causes it cloudy. Supplying the first- and second conducting electrodes with a second electric signal, that is, applying electric field to the liquid crystal, makes the liquid crystal cloudless.

19 Claims, 14 Drawing Sheets

3

ULTRASONIC LIQUID-CRYSTAL DISPLAY

BACKGROUND OF THE INVENTION

1. Field of the Invention

The present invention relates to an ultrasonic liquid-crystal display by means of using a dispersive interdigital transducer on a piezoelectric substrate formed on a first surface-part of a nonpiezoelectric bottom-plate, a sandwich formed on a second surface-part of the nonpiezoelectric bottom-plate and composed of a liquid crystal between first- and second conducting electrodes, and a nonpiezoelectric upper-plate on the sandwich.

2. Description of the Prior Art

In recent years, liquid-crystal displays act important parts on computers, portable communication devices, and so on. The thin-film transistor (TFT)-type liquid-crystal display, which is a popular one of conventional liquid-crystal displays, is good in quality. However, it is unavoidable that an electric power consumption to the backlight is 70~80% of all the electric power consumption to the display. Using reflective-type displays in place of nonreflective-type displays such as the TFT-type display cause a decrease in electric power. The reflective-type displays, for example, polymer dispersed display and guest-host mode display have problems on response time, accuracy and clearness, durability and manufacturing, electric power consumption, range of vision, inferiority in liquid crystal, and device size. On the other side, dynamic scattering mode display, which is the initial type, is not adequate for practical use at present.

SUMMARY OF THE INVENTION

An object of the present invention is to provide an ultrasonic liquid-crystal display with high accuracy and clearness.

Another object of the present invention is to provide an ultrasonic liquid-crystal display excellent in durability and manufacturing.

Another object of the present invention is to provide an ultrasonic liquid-crystal display operating with a quick response time.

Another object of the present invention is to provide an ultrasonic liquid-crystal display operating under low electric power consumption with low voltage.

Another object of the present invention is to provide an ultrasonic liquid-crystal display excellent in the range of vision.

Another object of the present invention is to provide an ultrasonic liquid-crystal display without the inferiority in liquid crystal.

Another object of the present invention is to provide an ultrasonic liquid-crystal display without a backlight behind the display.

Another object of the present invention is to provide an ultrasonic liquid-crystal display without polarizers.

A still other object of the present invention is to provide an ultrasonic liquid-crystal display having a small size and a simple structure which is very light in weight.

According to one aspect of the present invention there is provided an ultrasonic liquid-crystal display comprising a nonpiezoelectric bottom-plate, a piezoelectric substrate on a first surface-part of an upper end-surface of the nonpiezoelectric bottom-plate, at least one dispersive interdigital transducer on the piezoelectric substrate, a nonpiezoelectric upper-plate, first- and second conducting electrodes, and a liquid crystal between the first- and second conducting electrodes. The nonpiezoelectric bottom-plate and a nonpiezoelectric upper-plate have a transparency, respectively. The second surface-part of the upper end-surface of the nonpiezoelectric bottom-plate is covered with the first conducting electrode. The lower end-surface of the nonpiezoelectric upper-plate is covered with the second conducting electrode.

When a first electric signal is applied to the dispersive interdigital transducer, a frequency modulated chirp surface acoustic wave (an FM chirp-SAW) is excited in the piezoelectric substrate. The FM chirp-SAW is transmitted to the liquid crystal through the upper end-surface of the nonpiezoelectric bottom-plate, and causes the liquid crystal cloudy. In case of the liquid crystal being cloudy, if a second electric signal is applied between the first- and second conducting electrodes, that is, electric field is applied to the liquid crystal, the liquid crystal becomes cloudless.

According to another aspect of the present invention there is provided a piezoelectric substrate made of a piezoelectric ceramic thin plate, the polarization axis thereof being parallel to the thickness direction thereof.

According to another aspect of the present invention there is provided a piezoelectric substrate having a thickness smaller than the smallest interdigital periodicity of the dispersive interdigital transducer.

According to another aspect of the present invention there are provided a nonpiezoelectric bottom-plate and a nonpiezoelectric upper-plate, which have a thickness larger than two times the largest interdigital periodicity of the dispersive interdigital transducer, respectively.

According to another aspect of the present invention there is provided an ultrasonic liquid-crystal display, wherein the phase velocity of the FM chirp-SAW on the nonpiezoelectric bottom-plate alone is higher than that in the piezoelectric substrate alone.

According to another aspect of the present invention there is provided a liquid crystal made of a nematic liquid crystal.

According to another aspect of the present invention there is provided a liquid crystal, which is homogeneously oriented before receiving the FM chirp-SAW.

According to another aspect of the present invention there are provided first- and second conducting electrodes consisting of transparent electrodes made of indium-tin oxide.

According to another aspect of the present invention there are provided first- and second conducting electrodes comprising a group of slender subelectrodes, which form a stripe pattern, respectively. A stripe direction of the first conducting electrode and that of the second conducting electrode are vertical from each other. When the second electric signal is applied between at least one of the subelectrodes of the first conducting electrode and that of the second conducting electrode, electric field is applied to at least one crossing zone, in the liquid crystal, between the subelectrodes of the first- and second conducting electrodes. Thus, the crossing zone becomes cloudless.

According to another aspect of the present invention there are provided another piezoelectric substrate on a third surface-part of the upper end-surface of the nonpiezoelectric bottom-plate, and at least one input interdigital transducer thereon. The input interdigital transducer has the reverse electrode-finger pattern to the dispersive interdigital transducer. When a third electric signal is applied to the input interdigital transducer at the same time that the first electric signal is applied to the dispersive interdigital transducer, another FM chirp-SAW is excited in the piezoelectric substrate on the third surface-part of the upper end-surface of the nonpiezoelectric bottom-plate. The FM chirp-SAW is transmitted to the liquid crystal, and causes the liquid crystal further cloudy.

According to another aspect of the present invention there are provided another piezoelectric substrate on a third surface-part of the upper end-surface of the nonpiezoelectric bottom-plate, at least one output interdigital transducer thereon, and an amplifier connected between the dispersive interdigital transducer and the output interdigital transducer. The output interdigital transducer has the same electrode-finger pattern as the dispersive interdigital transducer.

According to another aspect of the present invention there is provided a light source under the nonpiezoelectric bottom-plate.

According to another aspect of the present invention there is provided a mirror under the nonpiezoelectric bottom-plate.

According to another aspect of the present invention there are provided first- and second polarizers and a color filter.

According to other aspect of the present invention there is provided an ultrasonic liquid-crystal display comprising at least two ultrasonic subdisplays forming a stacked body. Each of the ultrasonic subdisplays consists of a nonpiezoelectric bottom-plate having a transparency, a piezoelectric substrate on a first surface-part of an upper end-surface of the nonpiezoelectric bottom-plate, at least one dispersive interdigital transducer on the piezoelectric substrate, a nonpiezoelectric upper-plate, first- and second conducting electrodes, and a liquid crystal between the first- and second conducting electrodes. A second surface-part of the upper end-surface of the nonpiezoelectric bottom-plate is covered with the first conducting electrode. A lower end-surface of the nonpiezoelectric upper-plate is covered with the second conducting electrode.

According to a further aspect of the present invention there is provided an ultrasonic liquid-crystal display comprising a piezoelectric transparent substrate, at least one dispersive interdigital transducer on a first surface-part of an upper end-surface of the piezoelectric transparent substrate, a transparent nonpiezoelectric plate, first- and second conducting electrodes, and a liquid crystal between the first- and second conducting electrodes. A second surface-part of the upper end-surface of the piezoelectric transparent substrate is covered with the first conducting electrode. A lower end-surface of the transparent nonpiezoelectric plate is covered with the second conducting electrode.

When a first electric signal is applied to the dispersive interdigital transducer, an FM chirp-SAW is excited on the first surface-part of the upper end-surface of the piezoelectric transparent substrate. The FM chirp-SAW is transmitted to the liquid crystal through the second surface-part of the upper end-surface of the piezoelectric transparent substrate, and causes the liquid crystal cloudy. In case of the liquid crystal being cloudy, if a second electric signal is applied between the first- and second conducting electrodes, that is, electric field is applied to the liquid crystal, the liquid crystal becomes cloudless.

BRIEF DESCRIPTION OF THE DRAWINGS

Other features and advantages of the invention will be clarified from the following description with reference to the attached drawings.

DETAILED DESCRIPTION OF THE PRESENTLY PREFERRED EXEMPLARY EMBODIMENTS

Figure 1:
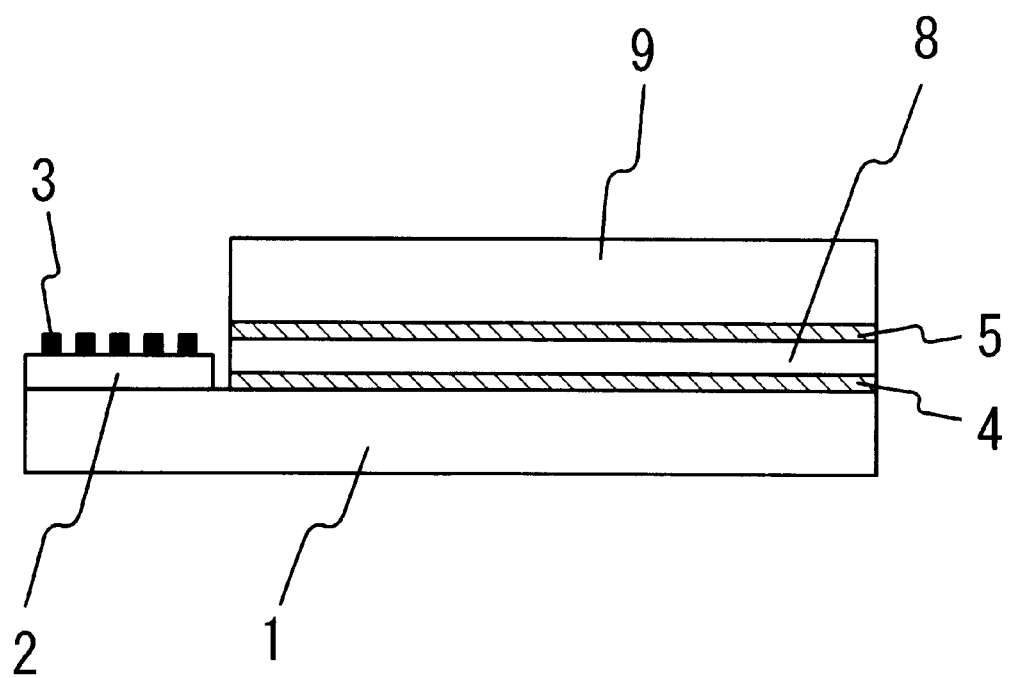
FIG. 1 shows a sectional view of an ultrasonic liquid-crystal display according to a first embodiment of the present invention.

FIG. 1 shows a sectional view of an ultrasonic liquid-crystal display according to a first embodiment of the present invention. The ultrasonic liquid-crystal display comprises nonpiezoelectric bottom-plate 1, piezoelectric substrate 2, dispersive interdigital transducer 3, first conducting electrode 4, second conducting electrode 5, first spacer 6, second spacer 7, liquid crystal 8, and nonpiezoelectric upper-plate 9. First spacer 6 and second spacer 7 are not drawn in FIG. 1. Nonpiezoelectric bottom-plate 1 and nonpiezoelectric upper-plate 9, made of transparent glass plates, have a dimension of 1.1 mm in thickness, respectively. The phase velocity of the SAW traveling on nonpiezoelectric bottom-plate 1 alone is higher than that traveling on piezoelectric substrate 2 alone. Piezoelectric substrate 2 is made of a piezoelectric ceramic thin plate with a dimension of 230 $\mu$m in thickness, and the polarization axis thereof is parallel to the thickness direction thereof. Dispersive interdigital transducer 3, made of an aluminum thin film, is formed on piezoelectric substrate 2, which is formed on a first surface-part of an upper end-surface of nonpiezoelectric bottom-plate 1. Liquid crystal 8 is made of a nematic liquid crystal, N-(4-methoxy benzylidene)-4'-butylaniline (MBBA). First conducting electrode 4 and second conducting electrode 5 consist of transparent electrodes made of indium-tin oxide. A second surface-part of the upper end-surface of nonpiezoelectric bottom-plate 1 is covered with first conducting electrode 4. A lower end surface of nonpiezoelectric upper-plate 9 is covered with second conducting electrode 5. Liquid crystal 8 is put, after the rubbing treatment, into a space, with a dimension of 6 μm in thickness, between first conducting electrode 4 and second conducting electrode 5, so that liquid crystal 8 is homogeneously oriented. Thus, nonpiezoelectric bottom-plate 1, first conducting electrode 4, liquid crystal 8, second conducting electrode 5, and nonpiezoelectric upper-plate 9 form a fivefold-layered construction.

Figure 2:
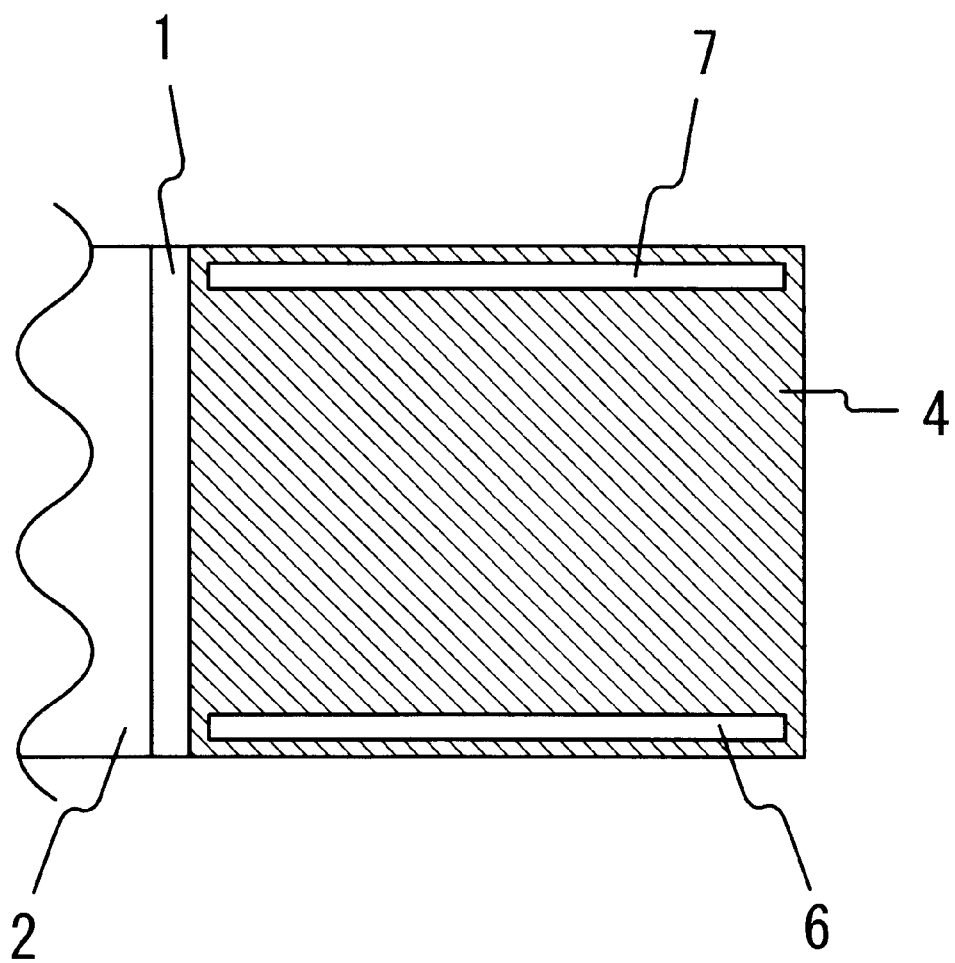
FIG. 2 shows a fragmentary top plan view of the ultrasonic liquid-crystal display in FIG. 1.

FIG. 2 shows a fragmentary top plan view of the ultrasonic liquid-crystal display in FIG. 1. Dispersive interdigital transducer 3, second conducting electrode 5, liquid crystal 8, and nonpiezoelectric upper-plate 9 are not drawn in FIG. 2. First spacer 6 and second spacer 7, which are formed on first conducting electrode 4, make the space shown in FIG. 1.

Figure 3:
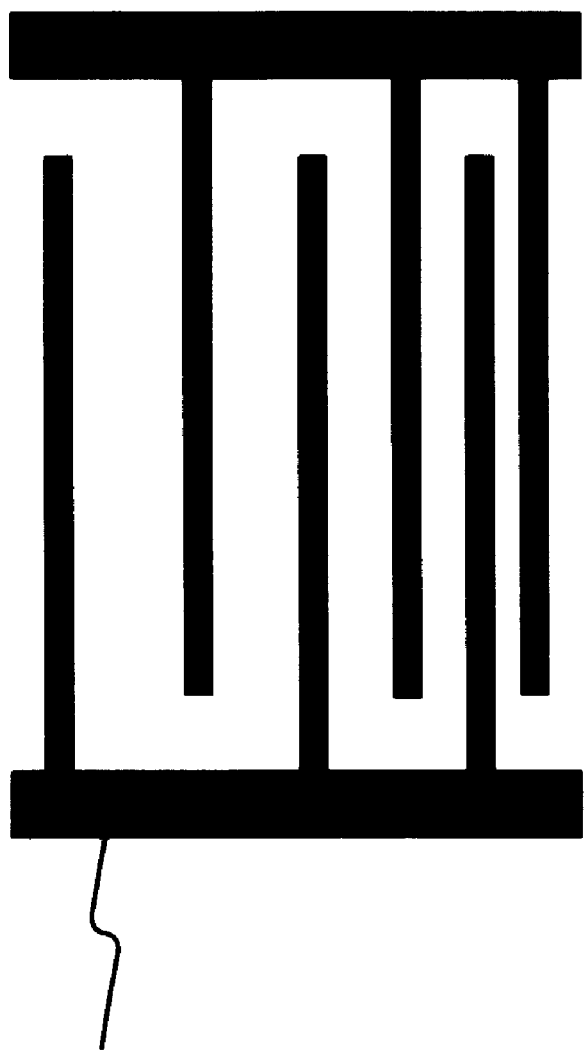
FIG. 3 shows a plan view of dispersive interdigital transducer 3.

FIG. 3 shows a plan view of dispersive interdigital transducer 3. Dispersive interdigital transducer 3 has interdigital periodicities of 400 ~500 μm.

Figure 4:
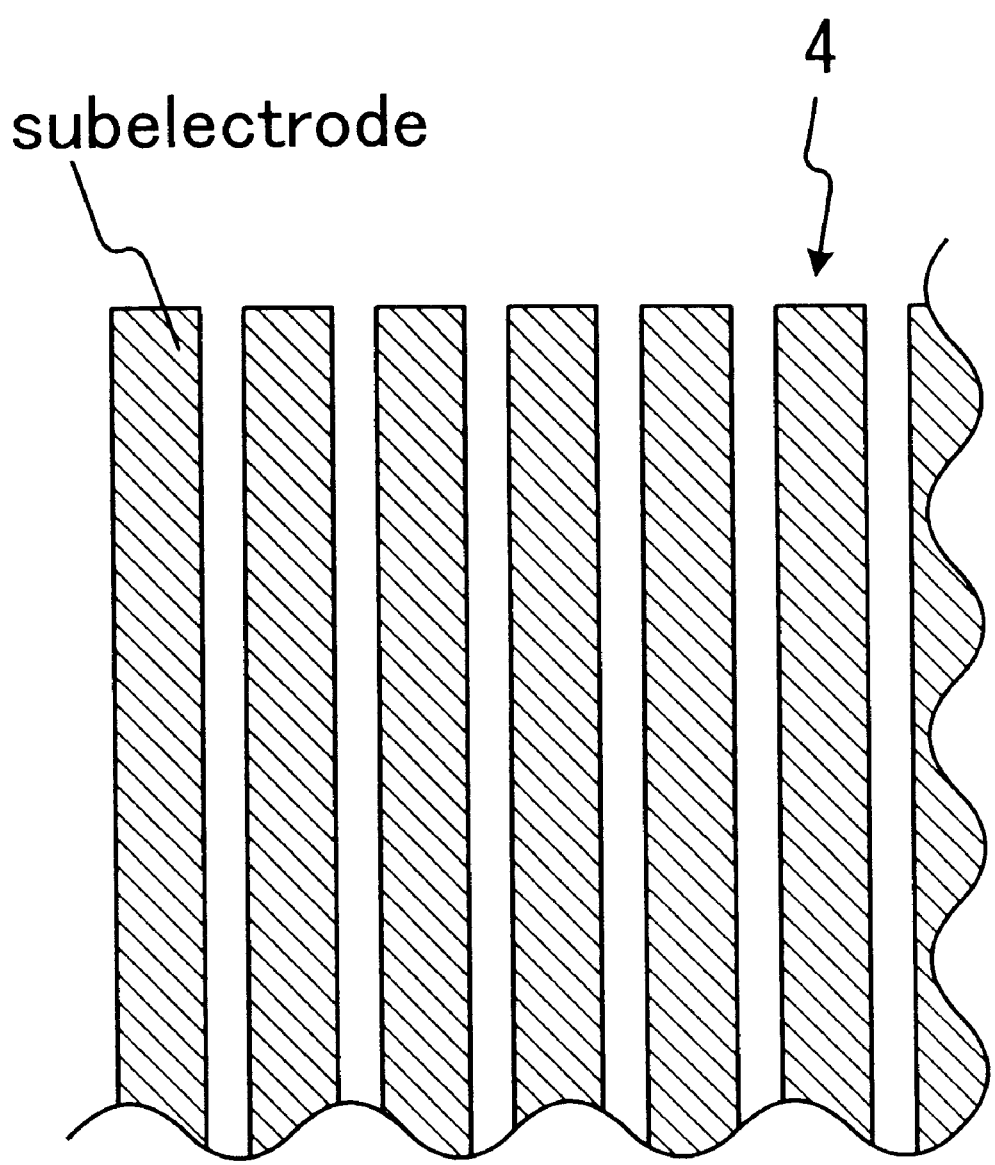
FIG. 4 shows a fragmentary plan view, on an enlarged scale, of first conducting electrode 4.

FIG. 4 shows a fragmentary plan view, on an enlarged scale, of first conducting electrode 4. First conducting electrode 4 comprises a group of slender subelectrodes forming a stripe pattern. Second conducting electrode 5 has the same construction as first conducting electrode 4, except that a stripe direction of first conducting electrode 4 and that of second conducting electrode 5 are vertical from each other.

In the ultrasonic liquid-crystal display in FIG. 1, when a first electric signal is applied to dispersive interdigital transducer 3, an FM chirp-SAW is excited in piezoelectric substrate 2. In this time, the FM chirp-SAW is effectively excited in piezoelectric substrate 2, because (1) dispersive interdigital transducer 3 has various interdigital periodicities as shown in FIG. 3, and (2) piezoelectric substrate 2 is made of a piezoelectric ceramic thin plate and the polarization axis thereof is parallel to the thickness direction thereof. In addition, if the phase velocity of the FM chirp-SAW is approximately the same as that of the Rayleigh wave traveling on nonpiezoelectric bottom-plate 1 alone, the first electric signal is effectively transduced to the FM chirp-SAW.

The FM chirp-SAW is effectively transmitted to liquid crystal 8 through the second surface-part of the upper end-surface of nonpiezoelectric bottom-plate 1 and then first conducting electrode 4, without a leakage of the FM chirp-SAW on the inside of nonpiezoelectric bottom-plate 1, because (1) the thickness of piezoelectric substrate 2 is smaller than the smallest interdigital periodicity of dispersive interdigital transducer 3, (2) the thickness of nonpiezoelectric bottom-plate 1 is larger than two times the largest interdigital periodicity of dispersive interdigital transducer 3, and (3) nonpiezoelectric bottom-plate 1 is made of the glass, in which the phase velocity of the FM chirp-SAW traveling on nonpiezoelectric bottom-plate 1 alone is higher than that piezoelectric substrate 2 alone. The FM chirp-SAW causes liquid crystal 8 cloudy.

In case of liquid crystal 8 being cloudy, if a second electric signal is applied, for example, between a third subelectrode of first conducting electrode 4 and a ninth subelectrode of second conducting electrode 5, electric field is applied to a crossing zone, in liquid crystal 8, between the third subelectrode of first conducting electrode 4 and the ninth subelectrode of second conducting electrode 5. In this time, the electric field changes the crossing zone in liquid crystal 8 from cloudy to cloudless. In the same way, if the second electric signal is applied between fourth- and sixth subelectrodes of first conducting electrode 4 and ninth- and eleventh subelectrodes of second conducting electrode 5, four crossing zones, in liquid crystal 8, between the fourth- and sixth subelectrodes of first conducting electrode 4 and the ninth- and eleventh subelectrodes of second conducting electrode 5, become cloudless.

Figure 5:
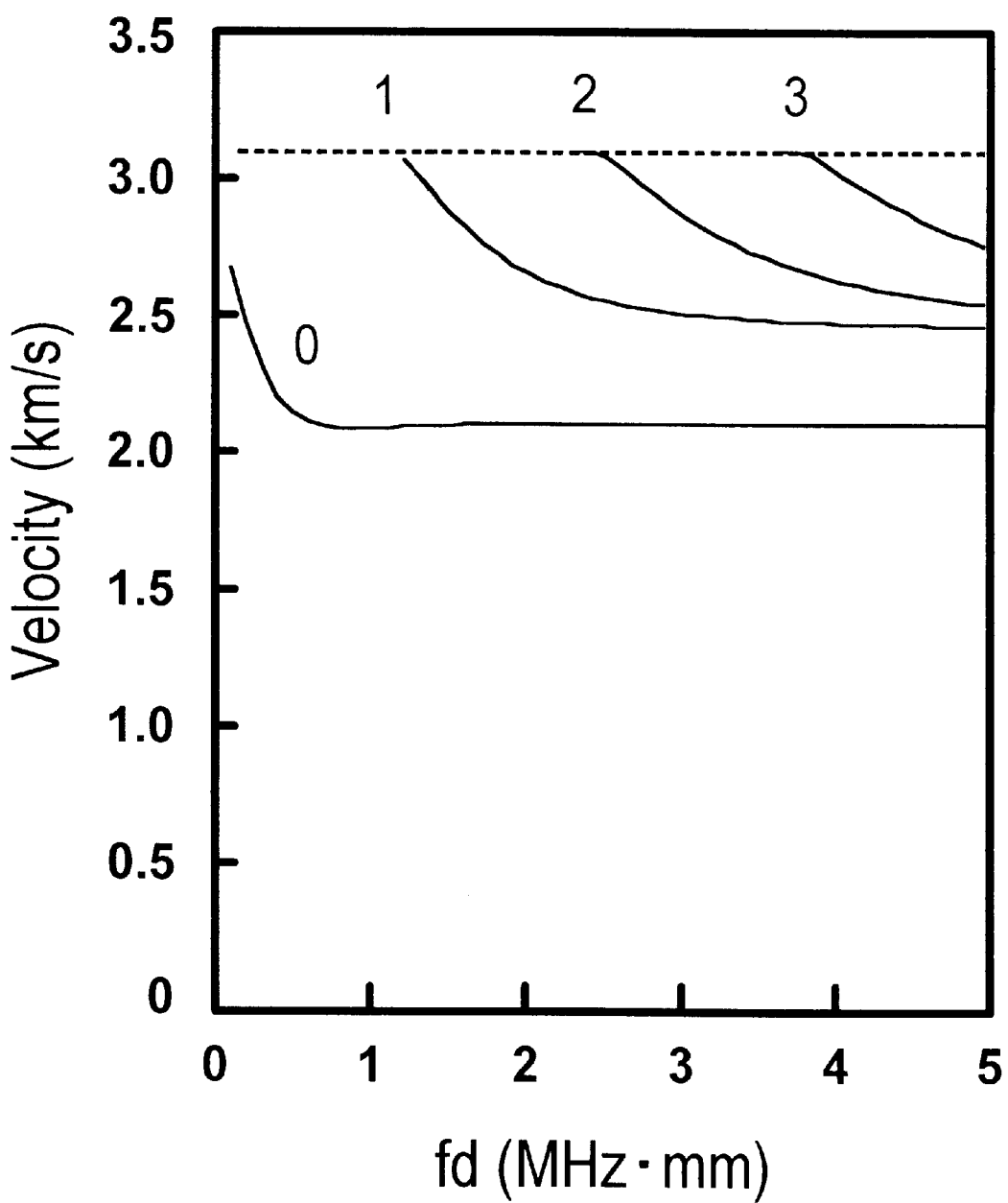
FIG. 5 shows the phase velocity curves of the SAWs in the double-layered substrate composed of nonpiezoelectric bottom-plate 1 and piezoelectric substrate 2.

FIG. 5 shows the phase velocity curves of the SAWs in the double-layered substrate composed of nonpiezoelectric bottom-plate 1 and piezoelectric substrate 2, which is formed on the first surface-part of the upper end-surface of nonpiezoelectric bottom-plate 1. The phase velocity curves are indicated as functions of fd value, where f is the frequency of the SAW and d is the thickness of piezoelectric substrate 2. A dotted line in FIG. 5 shows a shear wave velocity in nonpiezoelectric bottom-plate 1 alone. It should be noticed that the phase velocity of the SAW is lower than the shear wave velocity in nonpiezoelectric bottom-plate 1 alone.

Figure 6:
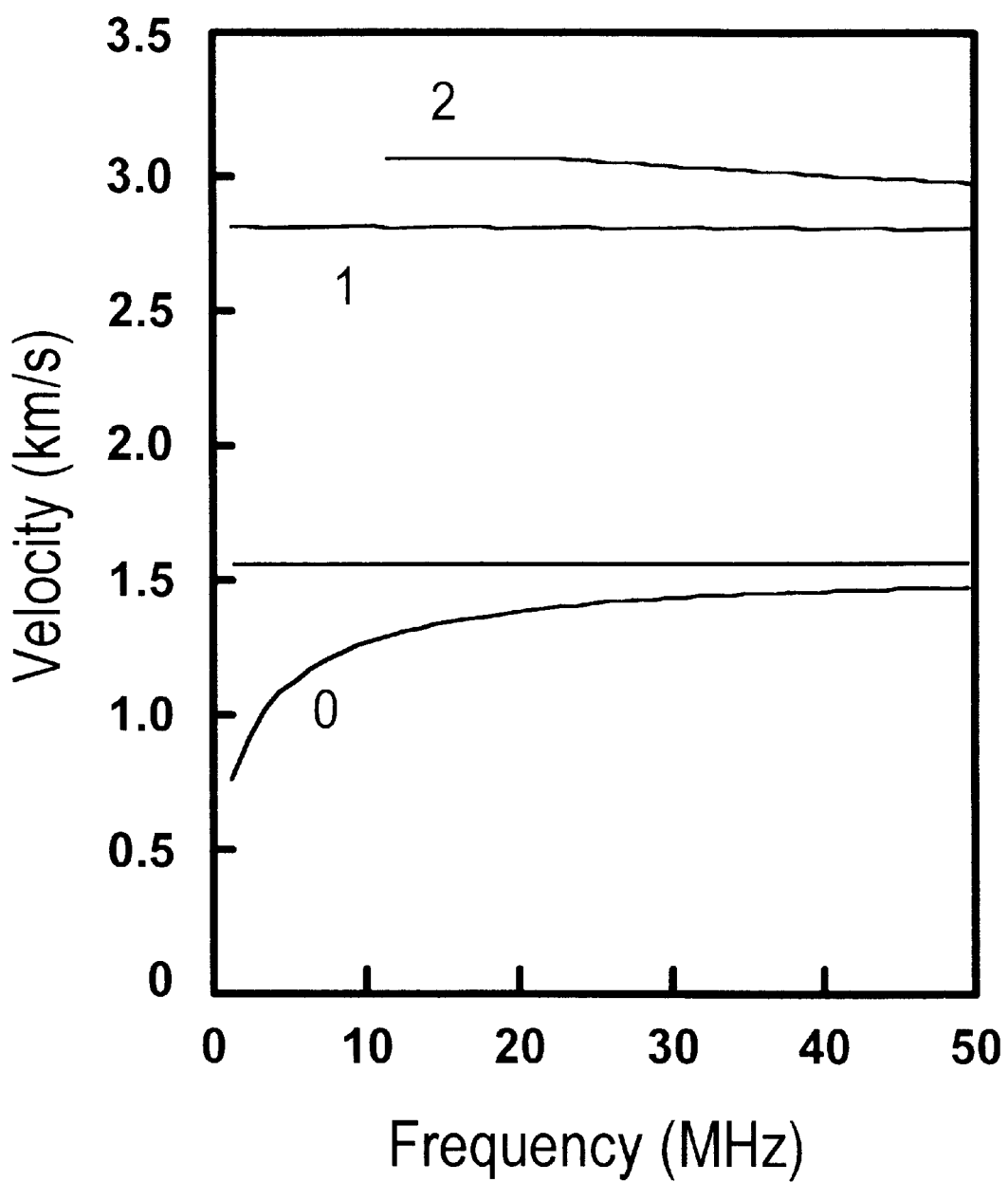
FIG. 6 shows the phase velocity curves of the elastic waves in the triple-layered substrate composed of nonpiezoelectric plat 1, liquid crystal 8, and nonpiezoelectric upper-plate 9.

FIG. 6 shows the phase velocity curves of the elastic waves in the triple-layered substrate composed of nonpiezoelectric plat 1, liquid crystal 8, and nonpiezoelectric upper-plate 9. The phase velocity curves are indicated as functions of the frequency of the elastic wave. It is clear that three modes of the elastic waves are available.

Figure 7:
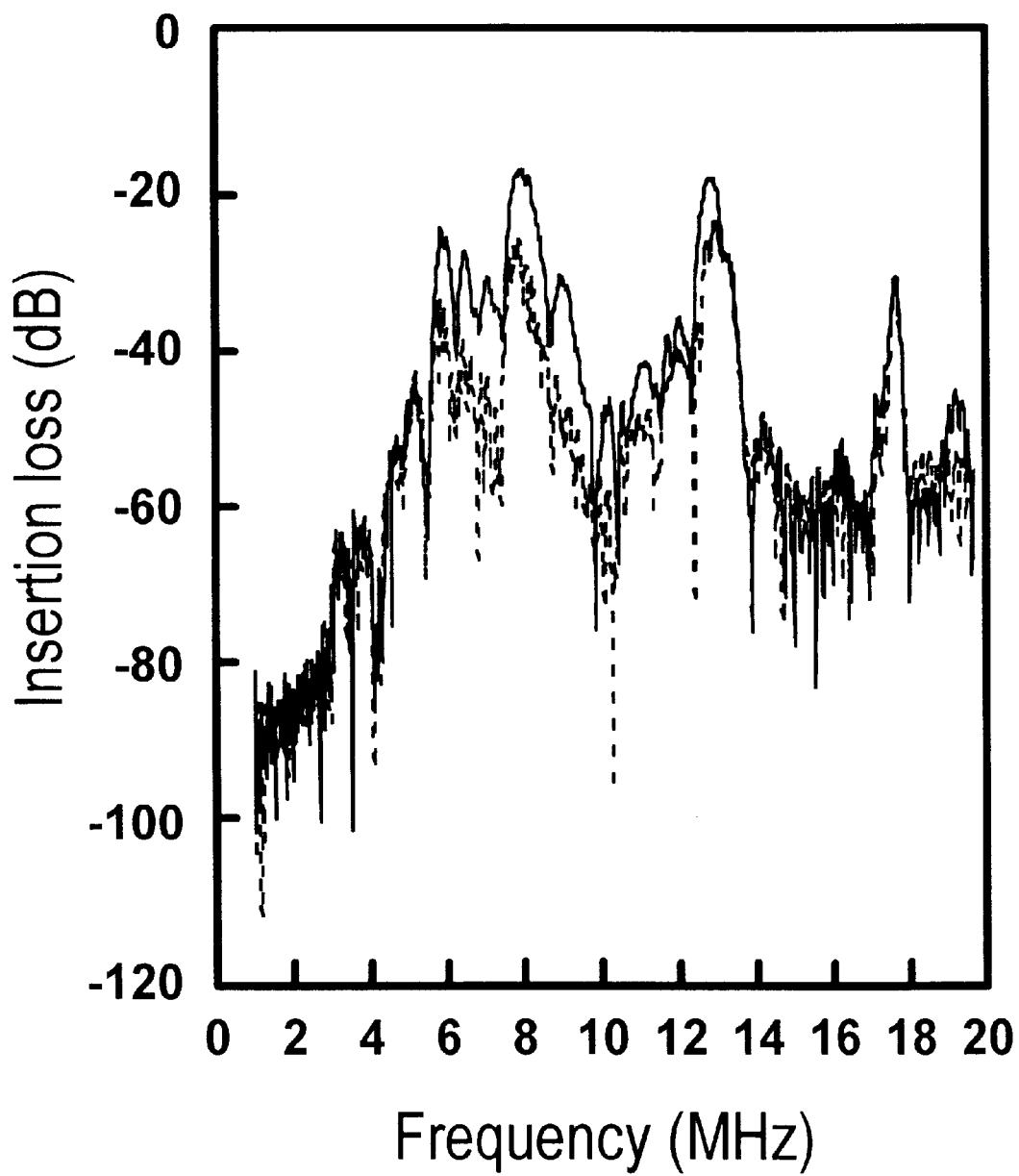
FIG. 7 shows a relationship between the insertion loss and the frequency in the ultrasonic liquid-crystal display in FIG. 1.

FIG. 7 shows a relationship between the insertion loss and the frequency in the ultrasonic liquid-crystal display in FIG. 1. A continuous trace corresponds to a case without liquid crystal 8, and a dotted trace corresponds to that with liquid crystal 8. It should be noticed that the existence of liquid crystal 8 does not cause so much an increase in insertion loss.

Figure 8:
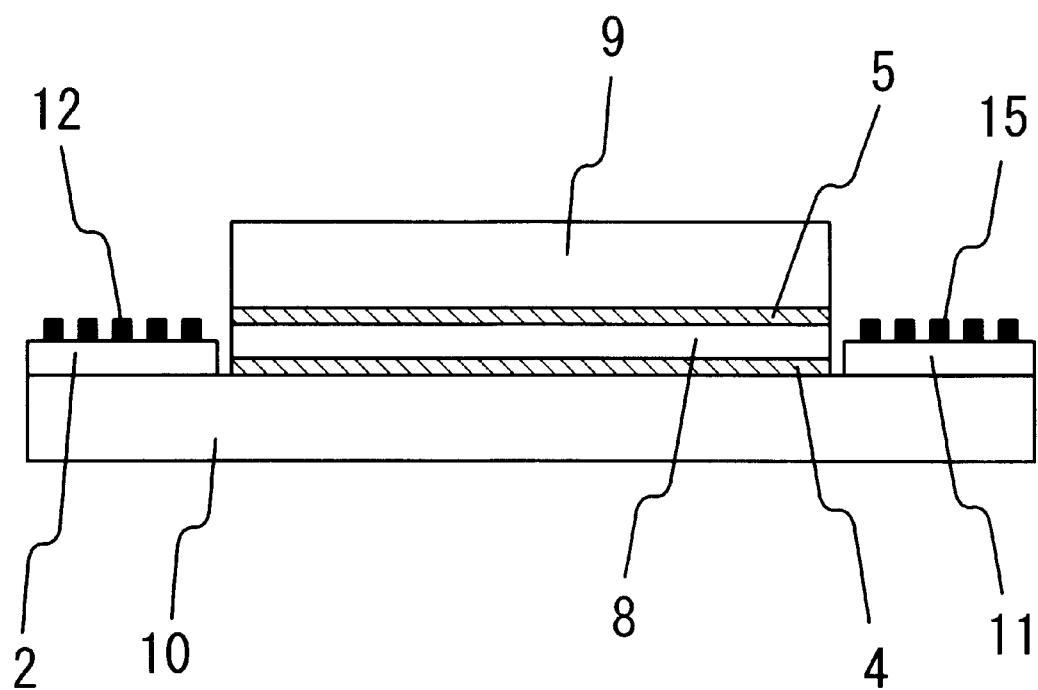
FIG. 8 shows a sectional view of an ultrasonic liquid-crystal display according to a second embodiment of the present invention.

FIG. 8 shows a sectional view of an ultrasonic liquid-crystal display according to a second embodiment of the present invention. The ultrasonic liquid-crystal display comprises nonpiezoelectric bottom-plate 10, piezoelectric substrate 2, another piezoelectric substrate 11, dispersive interdigital transducers 12, 13 and 14, input interdigital transducers 15, 16 and 17, first conducting electrode 4, second conducting electrode 5, first spacer 6, second spacer 7, liquid crystal 8, and nonpiezoelectric upper-plate 9. First spacer 6, second spacer 7, dispersive interdigital transducers 13 and 14, and input interdigital transducers 16 and 17 are not drawn in FIG. 8. Nonpiezoelectric bottom-plate 10 is made of the same material and has the same thickness as nonpiezoelectric bottom-plate 1. Piezoelectric substrate 11 is made of the same material and has the same size as piezoelectric substrate 2. Dispersive interdigital transducers 12, 13 and 14 are formed on piezoelectric substrate 2, which is formed on a first surface-part of an upper end-surface of nonpiezoelectric bottom-plate 10. A second surface-part of the upper end-surface of nonpiezoelectric bottom-plate 10 is covered with first conducting electrode 4. Interdigital transducers 15, 16 and 17 are formed on piezoelectric substrate 11, which is formed on a third surface-part of the upper end-surface of nonpiezoelectric bottom-plate 10. A lower end surface of nonpiezoelectric upper-plate 9 is covered with second conducting electrode 5. Liquid crystal 8 is put, in the same way as FIG. 2, into the space between first conducting electrode 4 and second conducting electrode 5.

Figure 9:
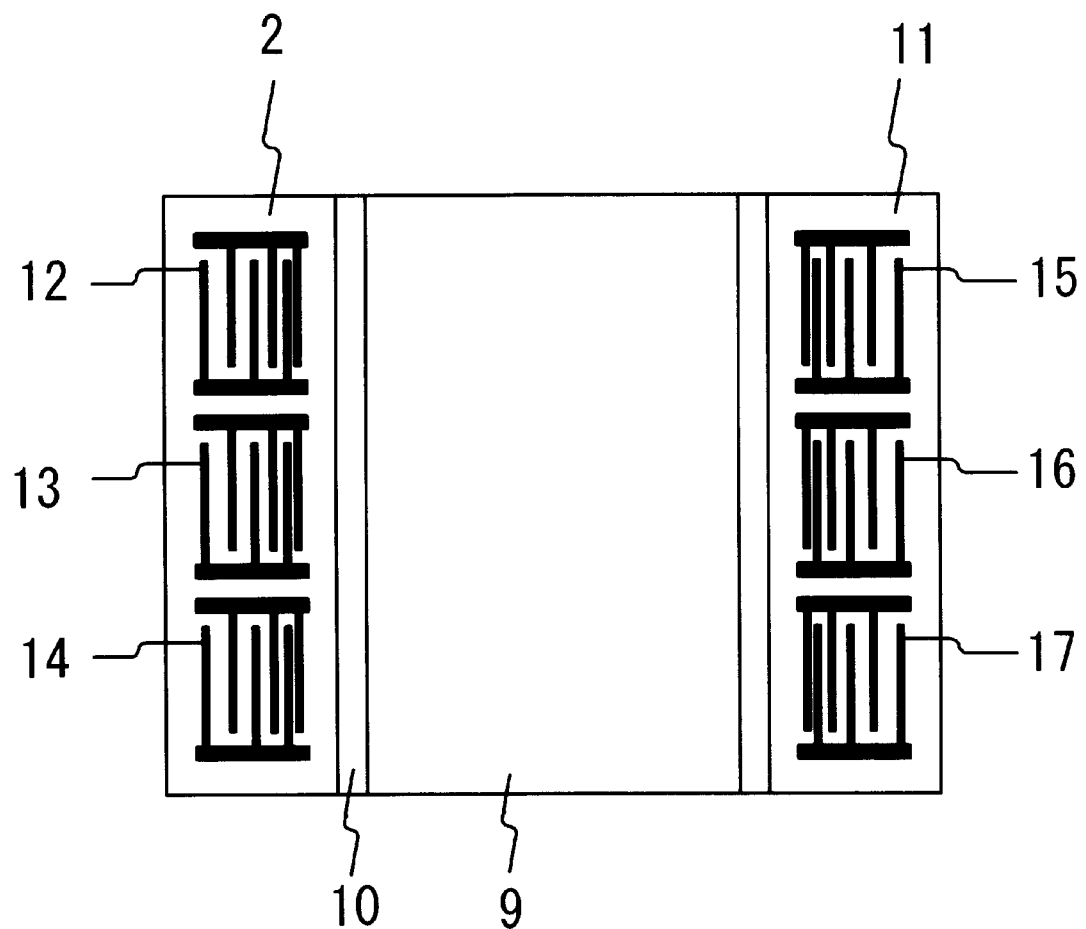
FIG. 9 shows a top plan view of the ultrasonic liquid-crystal display in FIG. 8.

FIG. 9 shows a top plan view of the ultrasonic liquid-crystal display in FIG. 8. First conducting electrode 4, second conducting electrode 5, first spacer 6, second spacer 7, and liquid crystal 8 are not drawn in FIG. 9. Dispersive interdigital transducers 12, 13 and 14 are made of the same material and have the same electrode-finger pattern as dispersive interdigital transducer 3, respectively. Input interdigital transducers 15, 16 and 17 are made of the same material as dispersive interdigital transducer 3, but have the reverse electrode-finger pattern to dispersive interdigital transducer 3, respectively.

In the ultrasonic liquid-crystal display in FIG. 8, a first electric signal is applied to dispersive interdigital transducers 12, 13 and 14 in turn, and at the same time, a third electric signal is applied to input interdigital transducers 15, 16 and 17 in turn. In this time, an FM chirp-SAW is excited at dispersive interdigital transducers 12, 13 and 14 in piezoelectric substrate 2 in turn, and at the same time, another FM chirp-SAW is excited at input interdigital transducers 15, 16 and 17 in piezoelectric substrate 11 in turn. The FM chirp-SAW at dispersive interdigital transducers 12, 13 and 14, and that at input interdigital transducers 15, 16 and 17 are effectively transmitted to liquid crystal 8 through the second surface-part of the upper end-surface of nonpiezoelectric bottom-plate 10, and causes liquid crystal 8 cloudy.

Figure 10:
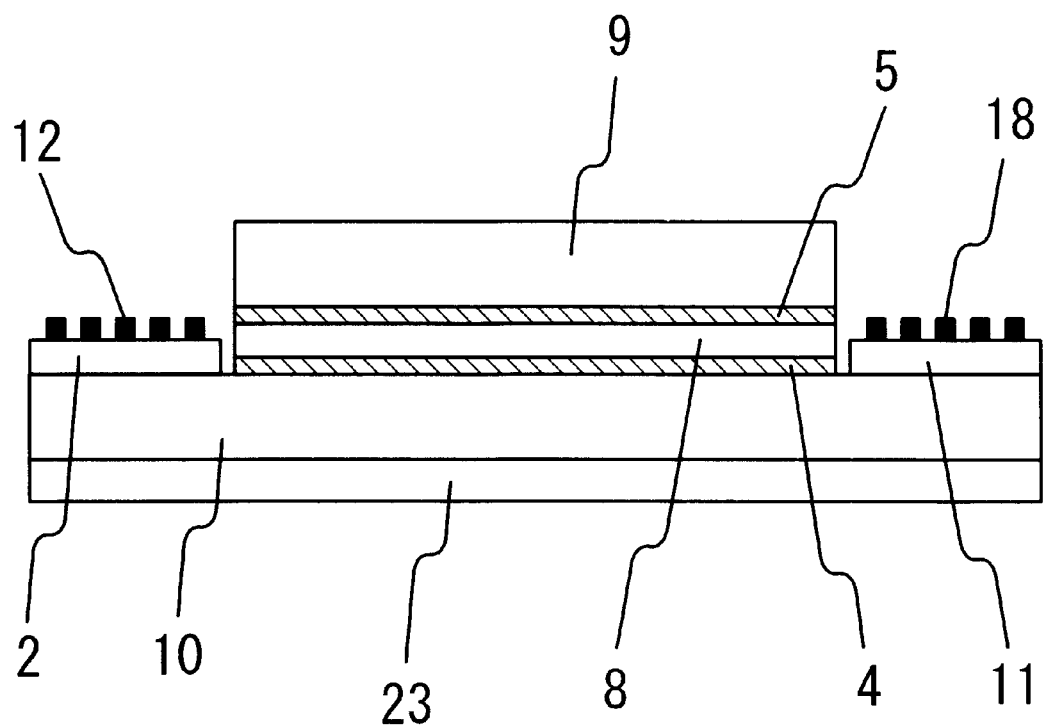
FIG. 10 shows a sectional view of an ultrasonic liquid-crystal display according to a third embodiment of the present invention.

FIG. 10 shows a sectional view of an ultrasonic liquid-crystal display according to a third embodiment of the present invention. The ultrasonic liquid-crystal display comprises nonpiezoelectric bottom-plate 10, piezoelectric substrate 2, piezoelectric substrate 11, dispersive interdigital transducers 12, 13 and 14, output interdigital transducers 18, 19 and 20, amplifier 21, switch 22, mirror 23, first conducting electrode 4, second conducting electrode 5, first spacer 6, second spacer 7, liquid crystal 8, and nonpiezoelectric upper-plate 9. First spacer 6, second spacer 7, dispersive interdigital transducers 13 and 14, output interdigital transducers 19 and 20, amplifier 21, and switch 22 are not drawn in FIG. 10. Piezoelectric substrate 2, first conducting electrode 4, and piezoelectric substrate 11 are formed on first-, second-, and third surface parts, respectively, of an upper end-surface of nonpiezoelectric bottom-plate 10. Dispersive interdigital transducers 12, 13 and 14 are formed on piezoelectric substrate 2 in the same way as FIG. 8. Output interdigital transducers 18, 19 and 20 are formed on piezoelectric substrate 11 in the same way as FIG. 8. Mirror 23 is formed under a lower end-surface of nonpiezoelectric bottom-plate 10.

Figure 11:
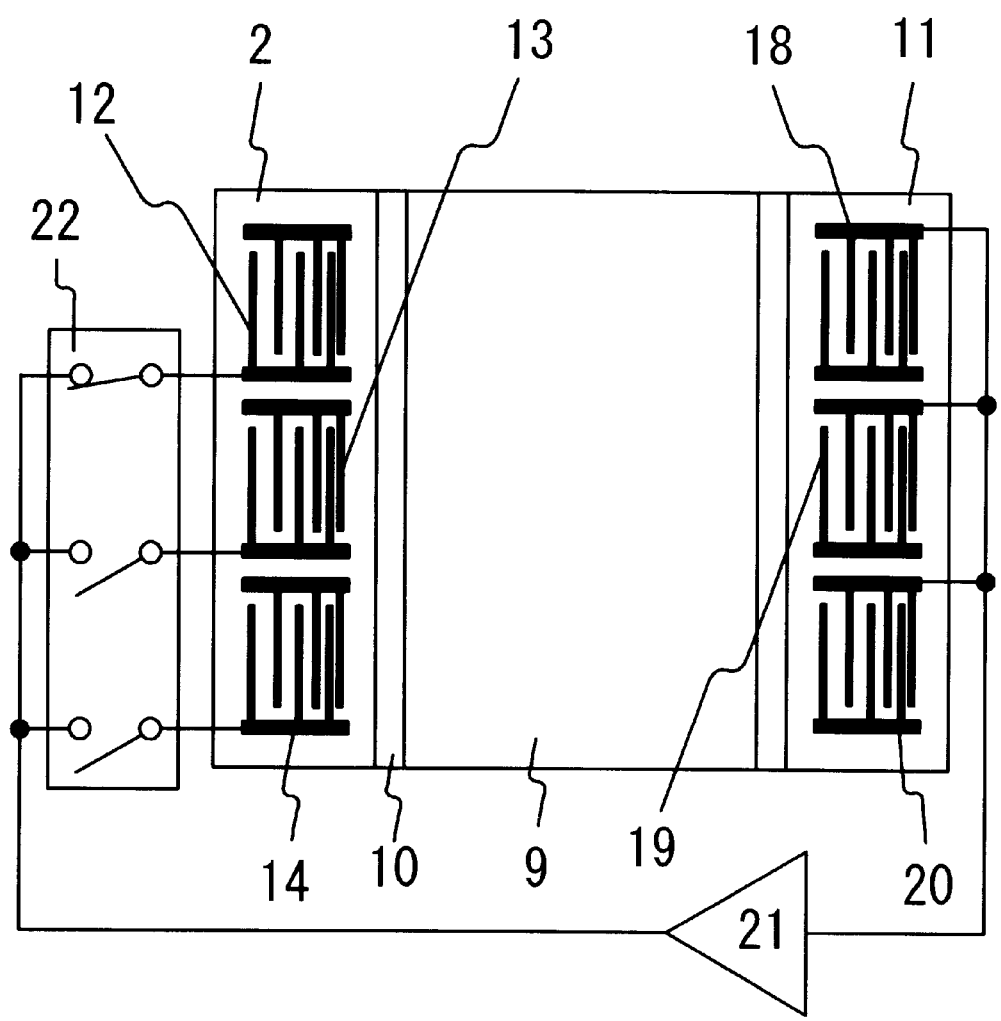
FIG. 11 shows a top plan view of the ultrasonic liquid-crystal display in FIG. 10.

FIG. 11 shows a top plan view of the ultrasonic liquid-crystal display in FIG. 10. First conducting electrode 4, second conducting electrode 5, first spacer 6, second spacer 7, liquid crystal 8, and mirror 23 are not drawn in FIG. 11. Dispersive interdigital transducers 12, 13 and 14, and output interdigital transducers 18, 19 and 20 are made of the same material and have the same electrode-finger pattern as dispersive interdigital transducer 3, respectively. Amplifier 21 is connected between switch 22 and output interdigital transducers 18, 19 and 20.

In the ultrasonic liquid-crystal display in FIG. 10, when a first electric signal is applied to dispersive interdigital transducers 12, 13 and 14 in turn via switch 22, an FM chirp-SAW is excited at dispersive interdigital transducers 12, 13 and 14, in turn, in piezoelectric substrate 2. The FM chirp-SAW is effectively transmitted to liquid crystal 8 and piezoelectric substrate 11 through the second- and third surface-parts, respectively, of the upper end-surface of nonpiezoelectric bottom-plate 10. The FM chirp-SAW in liquid crystal 8 causes liquid crystal 8 cloudy. On the other hand, the FM chirp-SAW in piezoelectric substrate 11 is detected at output interdigital transducers 18, 19 and 20 in turn as a pulse signal, which is amplified via amplifier 21 and applied again to dispersive interdigital transducers 12, 13 and 14 in turn via switch 22 as the first electric signal. Thus, it is possible to cause a self-oscillation type ultrasonic liquid-crystal display having a small-sized circuit with a simple structure and operating under low electric power consumption with low voltage.

If electric field is applied to a crossing zone, in liquid crystal 8, between a subelectrode of first conducting electrode 4 and that of second conducting electrode 5 by supplying the subelectrode of first conducting electrode 4 and that of second conducting electrode 5 with a second electric signal, the crossing zone in liquid crystal 8 becomes cloudless. In this time, mirror 23 reflects the light. Thus, it is possible to construct a reflective-type ultrasonic liquid-crystal display. In addition, it is possible to use light source 24 in place of mirror 23.

Figure 12:
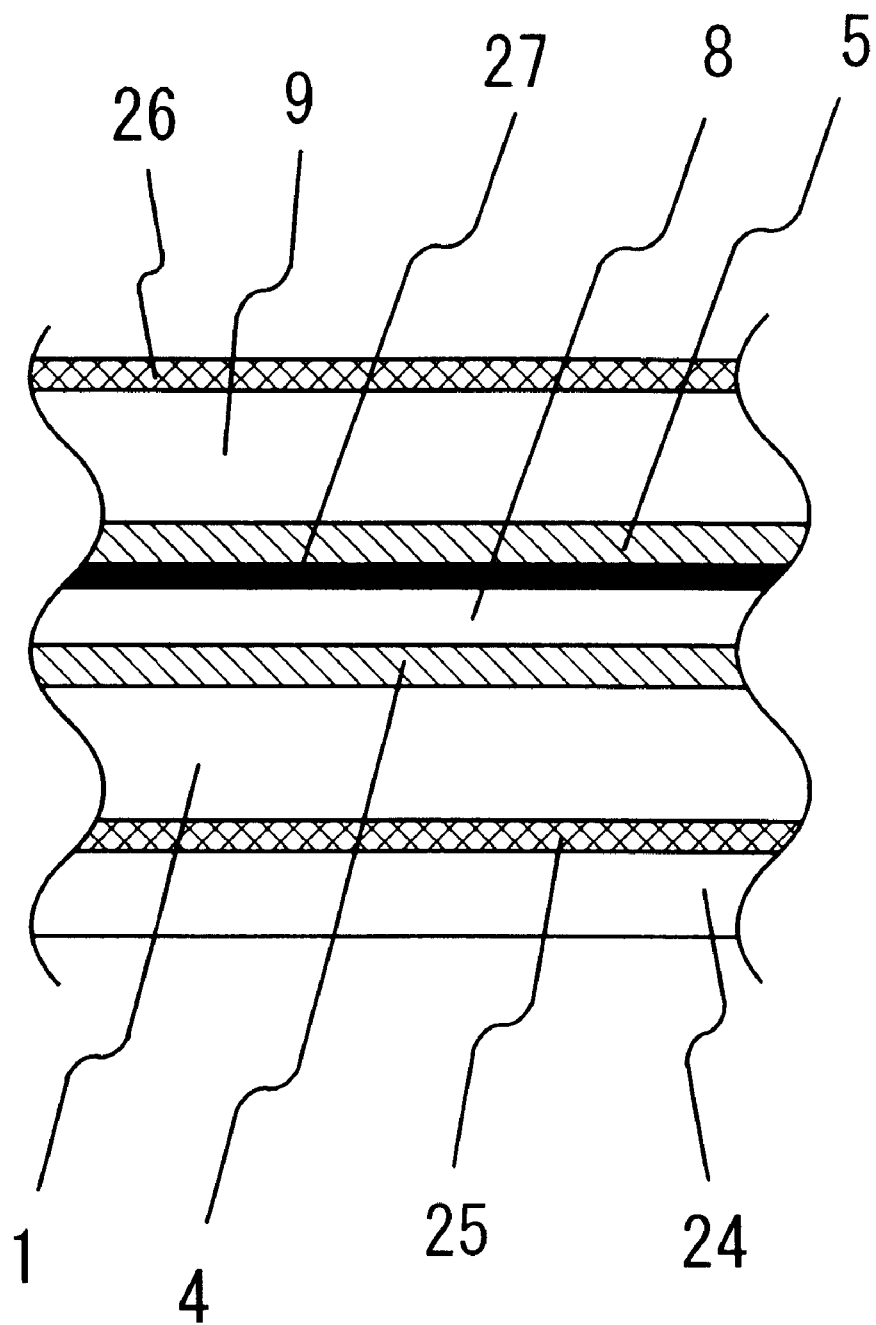
FIG. 12 shows a fragmentary sectional view, on an enlarged scale, of an ultrasonic liquid-crystal display according to a fourth embodiment of the present invention.

FIG. 12 shows a fragmentary sectional view, on an enlarged scale, of an ultrasonic liquid-crystal display according to a fourth embodiment of the present invention. The ultrasonic liquid-crystal display has the same construction as FIG. 1, except for further comprising light source 24, first polarizer 25, second polarizer 26, and a color filter 27. Piezoelectric substrate 2, dispersive interdigital transducer 3, first spacer 6, and second spacer 7 are not drawn in FIG. 12. Light source 24 is formed under a lower end-surface of nonpiezoelectric bottom-plate 1. First polarizer 25 is formed between light source 24 and the lower end-surface of nonpiezoelectric bottom-plate 1, and second polarizer 26 is formed on an upper end surface of nonpiezoelectric upper-plate 9. First polarizer 25 and second polarizer 26 are oriented so that their light-filtering orientations are at 90-degree angles to each other. Color filter 27 is formed between second conducting electrode 5 and liquid crystal 8.

In the ultrasonic liquid-crystal display in FIG. 12, an FM chirp-SAW excited in piezoelectric substrate 2, by supplying dispersive interdigital transducer 3 with a first electric signal, causes liquid crystal 8 cloudy, in the same way as the ultrasonic liquid-crystal display in FIG. 1. In this time, liquid crystal 8 blocks light from light source 24. If electric field is applied to a crossing zone, in liquid crystal 8, between a subelectrode of first conducting electrode 4 and that of second conducting electrode 5 by supplying the subelectrode of first conducting electrode 4 and that of second conducting electrode 5 with a second electric signal, the light passes through first polarizer 25, the crossing zone in liquid crystal 8, color filter 27, and second polarizer 26 one by one. Supplying three neighboring crossing-zones corresponding to red, green and blue, respectively, with voltages of varying amplitude blends the red, green, and blue to make various colors and tones. Thus, it is possible to construct a full-color type ultrasonic liquid-crystal display. In addition, it is possible to use mirror 23 in place of light source 24.

Figure 13:
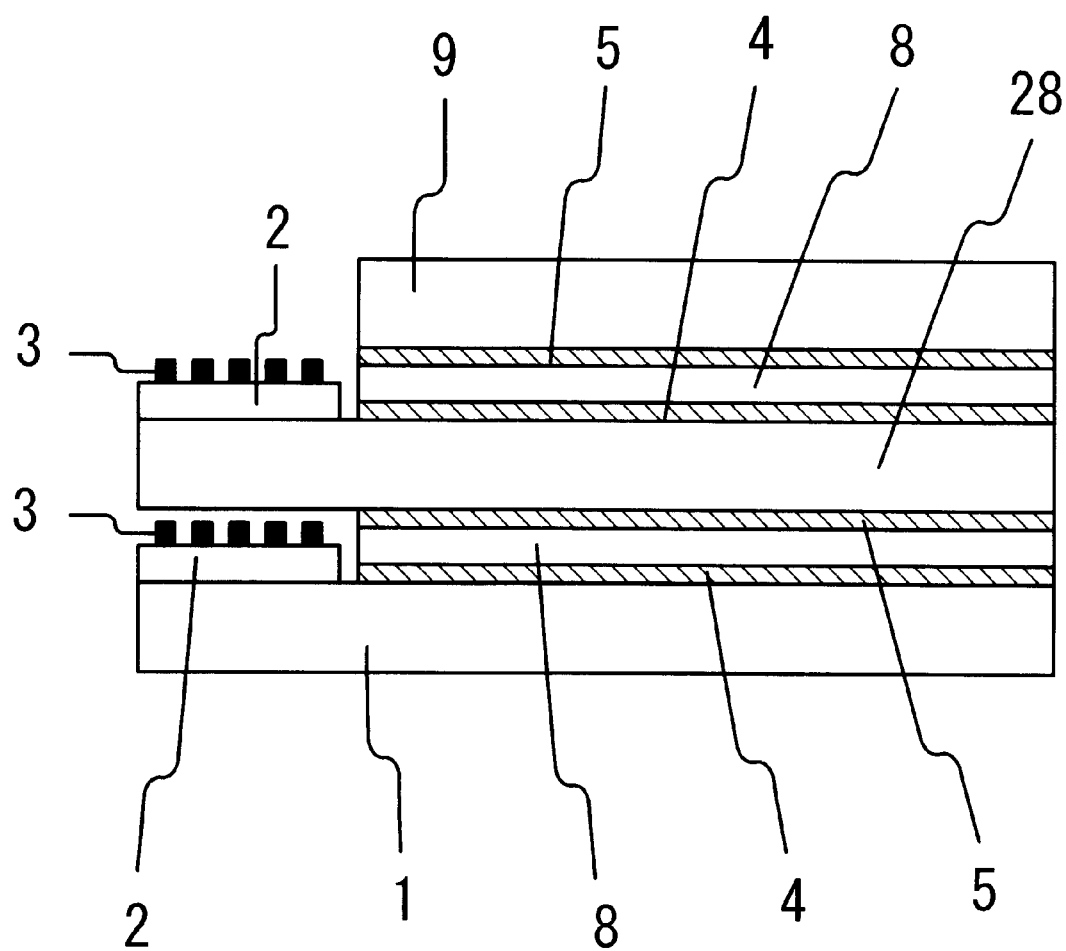
FIG. 13 shows a sectional view of an ultrasonic liquid-crystal display according to a fifth embodiment of the present invention.

FIG. 13 shows a sectional view of an ultrasonic liquid-crystal display according to a fifth embodiment of the present invention. The ultrasonic liquid-crystal display comprises upper- and lower ultrasonic subdisplays having the same construction as FIG. 1, respectively, and forming a stacked body with common nonpiezoelectric plate 28 between the ultrasonic subdisplays. Common nonpiezoelectric plate 28 acts as not only a nonpiezoelectric upper-plate of the lower ultrasonic subdisplay, but also a nonpiezoelectric bottom-plate of the upper ultrasonic subdisplay.

In the ultrasonic liquid-crystal display in FIG. 13, controlling the ultrasonic subdisplays independently produces a perspective drawing. In addition, it is possible to use three ultrasonic subdisplays: one for red, one for blue, and one for green. Such an arrangement enables a full-color type of perspective drawing.

Figure 14:
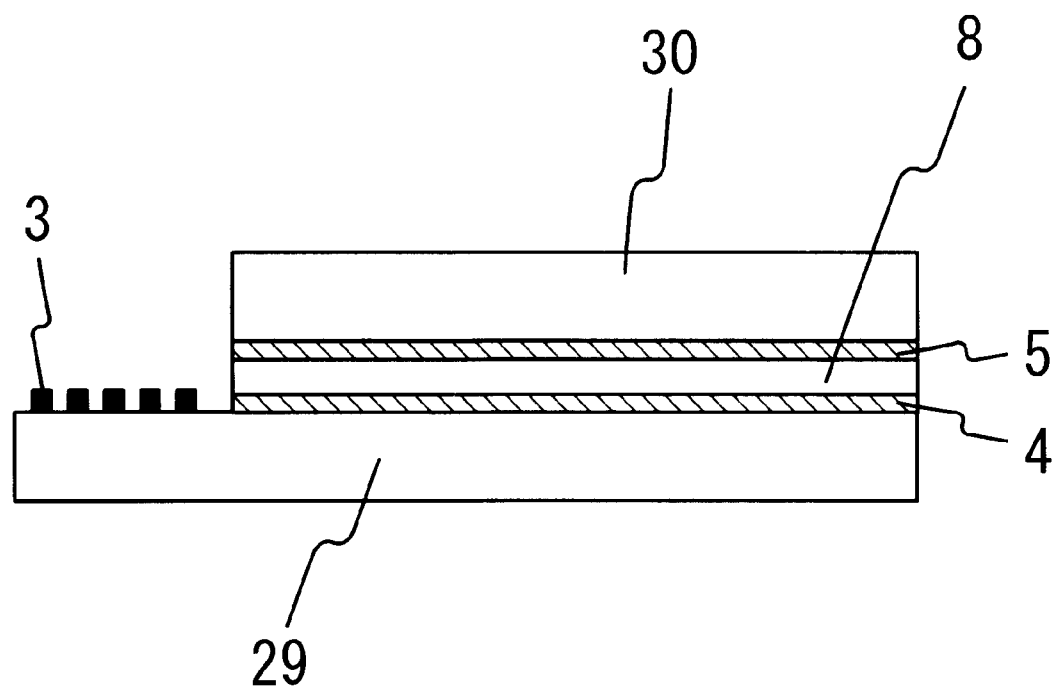
FIG. 14 shows a sectional view of an ultrasonic liquid-crystal display according to a sixth embodiment of the present invention.

FIG. 14 shows a sectional view of an ultrasonic liquid-crystal display according to a sixth embodiment of the present invention. The ultrasonic liquid-crystal display comprises transparent piezoelectric substrate 29, dispersive interdigital transducer 30, first conducting electrode 4, second conducting electrode 5, first spacer 6, second spacer 7, liquid crystal 8, and transparent nonpiezoelectric plate 31. First spacer 6 and second spacer 7 are not drawn in FIG. 1. Dispersive interdigital transducer 30, made of an aluminum thin film and having interdigital periodicities of 100~300 µm, is formed on a first surface-part of an upper end-surface of transparent piezoelectric substrate 29, which is made of a transparent piezoelectric ceramic thin plate, as $(Pb_{0.92}La_{0.08})(Zr_{0.53}Ti_{0.47})O_3$, with a dimension of 1 mm in thickness. The polarization axis of the first surface-part of the upper end-surface of transparent piezoelectric substrate 29 is previously made to be parallel to the thickness direction thereof. Transparent nonpiezoelectric plate 31 is made of the same material and has the same thickness as nonpiezoelectric upper-plate 9. A second surface-part of the upper end-surface of transparent piezoelectric substrate 29 is covered with first conducting electrode 4. A lower end surface of transparent nonpiezoelectric plate 31 is covered with second conducting electrode 5. Liquid crystal 8 is put, in the same way as FIG. 2, into the space between first conducting electrode 4 and second conducting electrode 5.

In the ultrasonic liquid-crystal display in FIG. 14, when a first electric signal is applied to dispersive interdigital transducer 30, an FM chirp-SAW is excited on the first surface-part of the upper end-surface of transparent piezoelectric substrate 29. The FM chirp-SAW is transmitted to liquid crystal 8 through the second surface-part of the upper end-surface of transparent piezoelectric substrate 29, and causes liquid crystal 8 cloudy. In this time, if a second electric signal is applied between a subelectrode of first conducting electrode 4 and that of second conducting electrode 5, electric field is applied to a crossing zone, in liquid crystal 8, between the subelectrode of first conducting electrode 4 and that of second conducting electrode 5. The electric field makes the crossing zone cloudless.

While this invention has been described in connection with what is presently considered to be the most practical and preferred embodiment, it is to be understood that the invention is not limited to the disclosed embodiment, but, on the contrary, is intended to cover various modifications and equivalent arrangements included within the spirit and scope of the appended claims.

What is claimed is:

1. An ultrasonic liquid-crystal display comprising:
    a nonpiezoelectric bottom-plate having a transparency;
    a piezoelectric substrate on a first surface-part of an upper end-surface of said nonpiezoelectric bottom-plate;
    at least one dispersive interdigital transducer on said piezoelectric substrate;
    a nonpiezoelectric upper-plate having a transparency;
    a first conducting electrode, with which a second surface-part of said upper end-surface of said nonpiezoelectric bottom-plate is covered;
    a second conducting electrode, with which a lower end-surface of said nonpiezoelectric upper-plate is covered; and
    a liquid crystal between said first- and second conducting electrodes,
        said at least one dispersive interdigital transducer receiving a first electric signal, exciting an FM chirp-SAW in said piezoelectric substrate, transmitting said FM chirp-SAW to said liquid crystal, and causing said liquid crystal cloudy,
        said first- and second conducting electrodes receiving a second electric signal, applying electric field to said liquid crystal, and making said liquid crystal cloudless.

2. An ultrasonic liquid-crystal display as defined in claim 1, wherein said piezoelectric substrate is made of a piezoelectric ceramic thin plate, the polarization axis thereof being parallel to the thickness direction thereof.

3. An ultrasonic liquid-crystal display as defined in claim 1, wherein said piezoelectric substrate has a thickness smaller than the smallest interdigital periodicity of said at least one dispersive interdigital transducer, and said nonpiezoelectric bottom-plate and said nonpiezoelectric upper-plate have a thickness larger than two times the largest interdigital periodicity of said at least one dispersive interdigital transducer.

4. An ultrasonic liquid-crystal display as defined in claim 1, wherein the phase velocity of said FM chirp-SAW on said nonpiezoelectric bottom-plate alone is higher than that in said piezoelectric substrate alone.

5. An ultrasonic liquid-crystal display as defined in claim 1, wherein said liquid crystal is made of a nematic liquid crystal.

6. An ultrasonic liquid-crystal display as defined in claim 1, wherein said liquid crystal is homogeneously oriented before receiving said FM chirp-SAW.

7. An ultrasonic liquid-crystal display as defined in claim 1, wherein said first- and second conducting electrodes consist of transparent electrodes made of indium-tin oxide.

8. An ultrasonic liquid-crystal display as defined in claim 1, wherein
    said first- and second conducting electrodes comprise a group of slender subelectrodes, forming a stripe pattern, respectively,
    a stripe direction of said first conducting electrode and that of said second conducting electrode are vertical from each other,
    at least one of said subelectrodes of said first conducting electrode and that of said second conducting electrode receive said second electric signal, apply electric field to at least one crossing zone, in said liquid crystal, between said at least one of said subelectrodes of said first conducting electrode and that of said second conducting electrode, and make said at least one crossing zone cloudless.

9. An ultrasonic liquid-crystal display as defined in claim 1 further comprising:
    another piezoelectric substrate on a third surface-part of said upper end-surface of said nonpiezoelectric bottom-plate;
    at least one input interdigital transducer, having the reverse electrode-finger pattern to said at least one dispersive interdigital transducer, on said another piezoelectric substrate,
    said at least one input interdigital transducer receiving a third electric signal at the same time that said at least one dispersive interdigital transducer receives said first electric signal, exciting another FM chirp-SAW in said another piezoelectric substrate, transmitting said another FM chirp-SAW to said liquid crystal, and causing said liquid crystal further cloudy.

10. An ultrasonic liquid-crystal display as defined in claim 1 further comprising:
    another piezoelectric substrate on a third surface-part of said upper end-surface of said nonpiezoelectric bottom-plate;
    at least one output interdigital transducer, having the same electrode-finger pattern as said at least one dispersive interdigital transducer, on said another piezoelectric substrate; and an amplifier connected between said at least one dispersive interdigital transducer and said at least one output interdigital transducer.

11. An ultrasonic liquid-crystal display as defined in claim 1 further comprising a light source under said nonpiezoelectric bottom-plate.

12. An ultrasonic liquid-crystal display as defined in claim 1 further comprising a mirror under said nonpiezoelectric bottom-plate.

13. An ultrasonic liquid-crystal display as defined in claim 1 further comprising first- and second polarizers and a color filter.

14. An ultrasonic liquid-crystal display comprising:
at least two ultrasonic subdisplays, which form a stacked body, each of said at least two ultrasonic subdisplays consisting of
a nonpiezoelectric bottom-plate having a transparency,
a piezoelectric substrate on a first surface-part of an upper end-surface of said nonpiezoelectric bottom-plate,
at least one dispersive interdigital transducer on said piezoelectric substrate,
a nonpiezoelectric upper-plate having a transparency,
a first conducting electrode, with which a second surface-part of said upper end-surface of said nonpiezoelectric bottom-plate is covered,
a second conducting electrode, with which a lower end-surface of said nonpiezoelectric upper-plate is covered, and
a liquid crystal between said first- and second conducting electrodes,
said at least one dispersive interdigital transducer receiving a first electric signal, exciting an FM chirp-SAW in said piezoelectric substrate, transmitting said FM chirp-SAW to said liquid crystal, and causing said liquid crystal cloudy,
said first- and second conducting electrodes receiving a second electric signal, applying electric field to said liquid crystal, and making said liquid crystal cloudless.

15. An ultrasonic liquid-crystal display as defined in claim 14, wherein said first- and second conducting electrodes consist of transparent electrodes made of indium-tin oxide.

16. An ultrasonic liquid-crystal display as defined in claim 14, wherein
said first- and second conducting electrodes comprise a group of slender subelectrodes, forming a stripe pattern, respectively,
a stripe direction of said first conducting electrode and that of said second conducting electrode are vertical from each other,
at least one of said subelectrodes of said first conducting electrode and that of said second conducting electrode receive said second electric signal, apply electric field to at least one crossing zone, in said liquid crystal, between said at least one of said subelectrodes of said first conducting electrode and that of said second conducting electrode, and make said at least one crossing zone cloudless.

17. An ultrasonic liquid-crystal display as defined in claim 14 further comprising:
another piezoelectric substrate on a third surface-part of said upper end-surface of said nonpiezoelectric bottom-plate;
at least one input interdigital transducer, having the reverse electrode-finger pattern to said at least one dispersive interdigital transducer, on said another piezoelectric substrate,
said at least one input interdigital transducer receiving a third electric signal at the same time that said at least one dispersive interdigital transducer receives said first electric signal, exciting another FM chirp-SAW in said another piezoelectric substrate, transmitting said another FM chirp-SAW to said liquid crystal, and causing said liquid crystal further cloudy.

18. An ultrasonic liquid-crystal display as defined in claim 14 further comprising:
another piezoelectric substrate on a third surface-part of said upper end-surface of said nonpiezoelectric bottom-plate;
at least one output interdigital transducer, having the same electrode-finger pattern as said at least one dispersive interdigital transducer, on said another piezoelectric substrate; and
an amplifier connected between said at least one dispersive interdigital transducer and said at least one output interdigital transducer.

19. An ultrasonic liquid-crystal display comprising:
a piezoelectric transparent substrate;
at least one dispersive interdigital transducer on a first surface-part of an upper end-surface of said piezoelectric transparent substrate;
a transparent nonpiezoelectric plate;
a first conducting electrode, with which a second surface-part of said upper end-surface of said piezoelectric transparent substrate is covered;
a second conducting electrode, with which a lower end-surface of said transparent nonpiezoelectric plate is covered; and
a liquid crystal between said first- and second conducting electrodes,
said at least one dispersive interdigital transducer receiving a first electric signal, exciting an FM chirp-SAW on said upper end-surface of said piezoelectric transparent substrate, transmitting said FM chirp-SAW to said liquid crystal, and causing said liquid crystal cloudy,
said first- and second conducting electrodes receiving a second electric signal, applying electric field to said liquid crystal, and making said liquid crystal cloudless.

* * * * *